Figure 1:
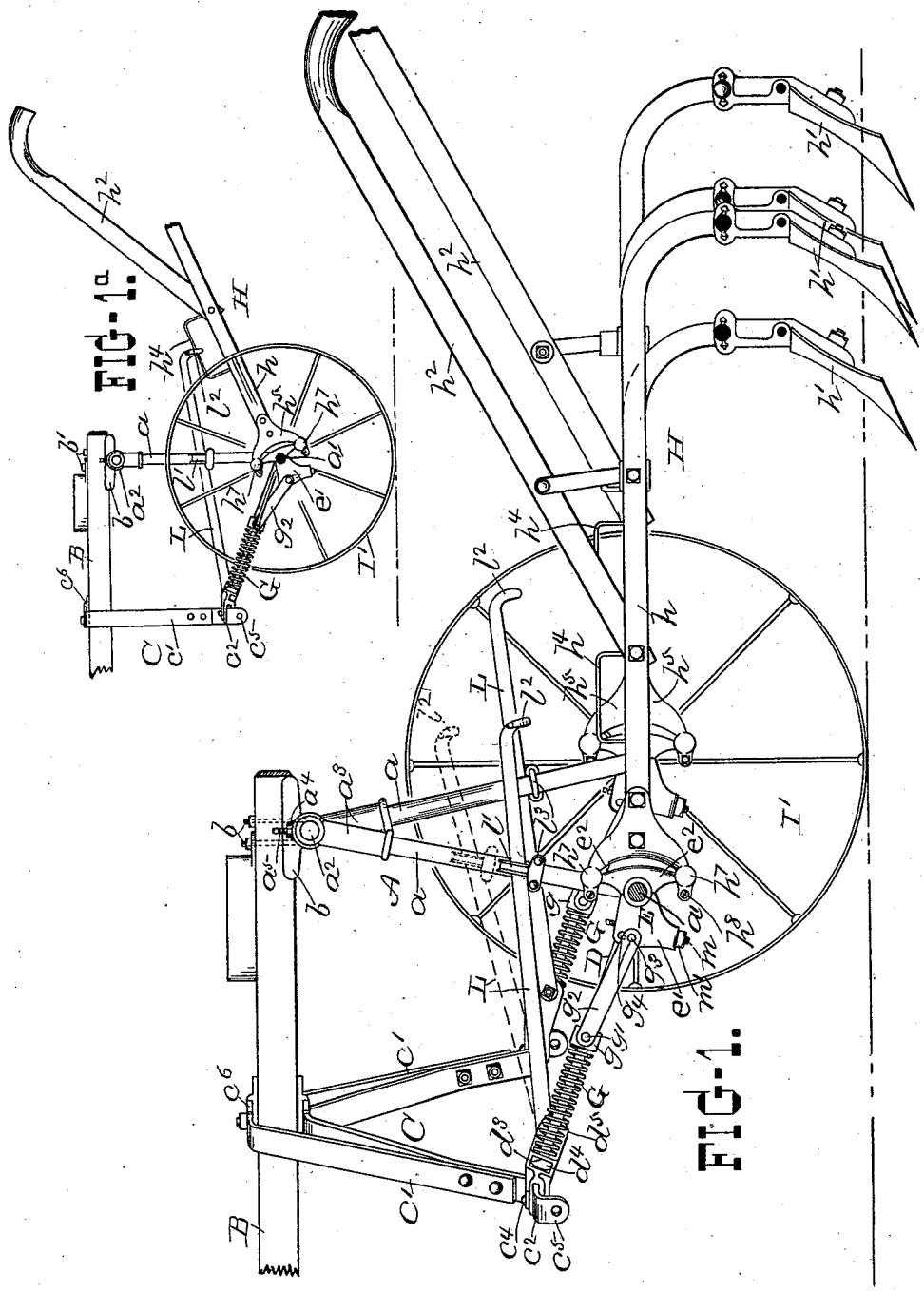

(No Model.) 6 Sheets—Sheet 3.
W. T. M. BRUNNEMER.
CULTIVATOR.

No. 534,493. Patented Feb. 19, 1895.

WITNESSES
Will L. Paul
H. M. Richards.

INVENTOR
Wm. T. M. Brunnemer,
By W. B. Richards,
Atty.

(No Model.) 6 Sheets—Sheet 4.
W. T. M. BRUNNEMER.
CULTIVATOR.
No. 534,493. Patented Feb. 19, 1895.
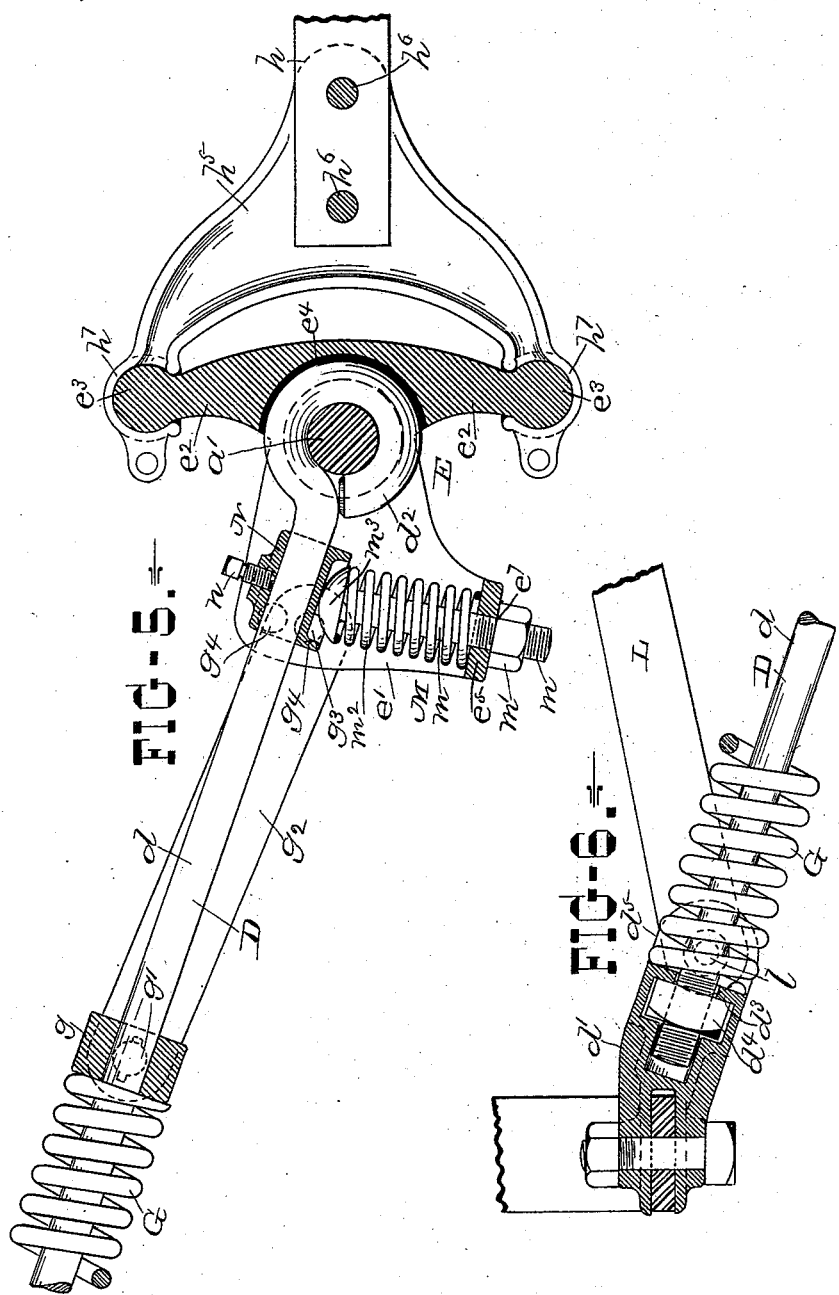
WITNESSES
Will L. Paul
H. M. Richards.
INVENTOR
Wm. T. M. Brunnemer,
By W. B. Richards,
Atty.

(No Model.) 6 Sheets—Sheet 5.
W. T. M. BRUNNEMER.
CULTIVATOR.
No. 534,493. Patented Feb. 19, 1895.
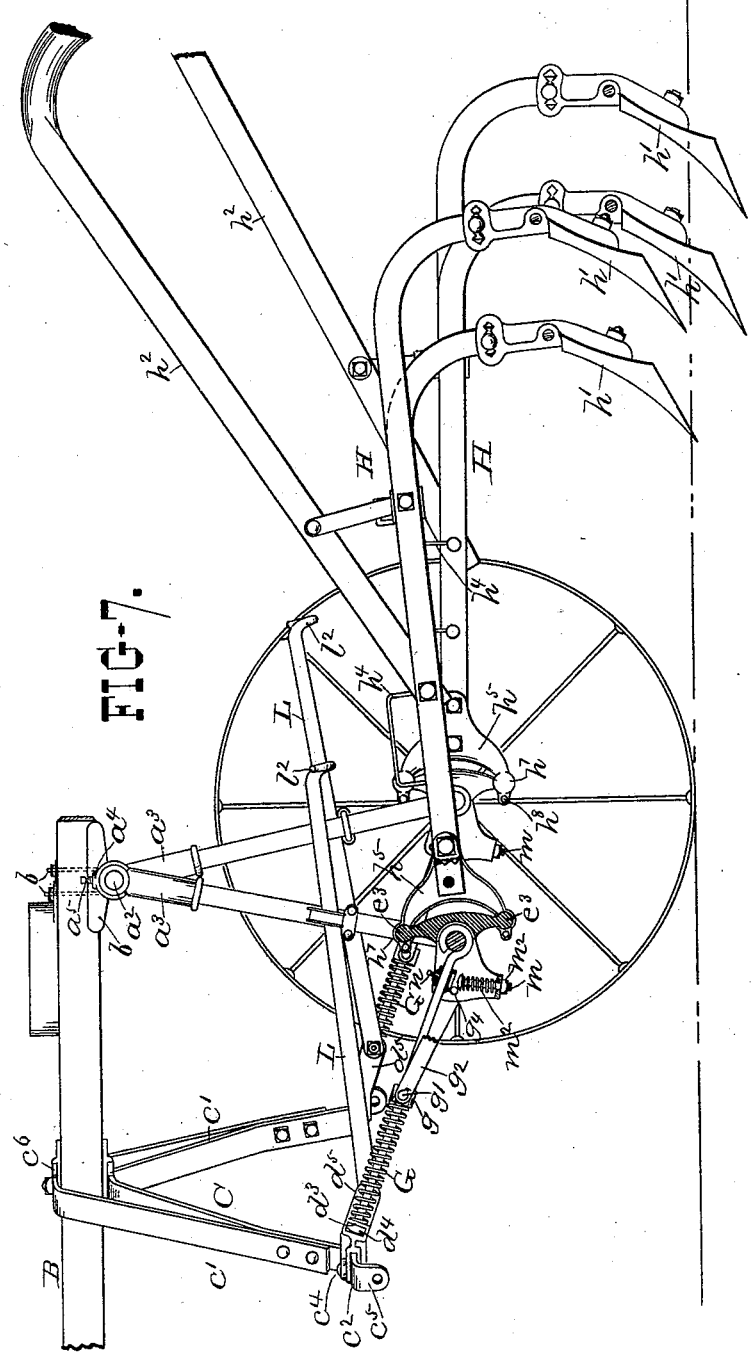
WITNESSES
Will. L. Paul.
H. M. Richards.
INVENTOR
Wm. T. M. Brunnemer,
By W. B. Richards,
Atty.

(No Model.) 6 Sheets—Sheet 6.

W. T. M. BRUNNEMER.
CULTIVATOR.

No. 534,493. Patented Feb. 19, 1895.

WITNESSES:
Will L. Paul
H. M. Richards.

INVENTOR:
Wm. T. M. Brunnemer,
By W. B. Richards,
Atty.

THE NORRIS PETERS CO., PHOTO-LITHO., WASHINGTON, D. C.

UNITED STATES PATENT OFFICE.

WILLIAM T. M. BRUNNEMER, OF MONMOUTH, ILLINOIS, ASSIGNOR TO THE WEIR PLOW COMPANY, OF SAME PLACE.

CULTIVATOR.

SPECIFICATION forming part of Letters Patent No. 534,493, dated February 19, 1895.

Application filed September 28, 1894. Serial No. 524,322. (No model.)

*To all whom it may concern:*

Be it known that I, WILLIAM T. M. BRUNNEMER, a citizen of the United States, residing at Monmouth, in the county of Warren and State of Illinois, have invented certain new and useful Improvements in Cultivators, of which the following is a specification.

While the invention that is herein described may be embodied and used in wheel cultivators of different classes or types, the wheel cultivator to which this invention more especially pertains and in connection with which it is herein shown and described, as embodied, is of that class or type in which the vertical or approximately vertical side parts of the arched axle, having lower ends which are formed into or are provided with horizontal journals for the supporting wheels, are pivotally connected with each other at their adjacent upper ends, or with a central upper part, in such manner as to permit of said side parts oscillating, or swinging forwardly or backwardly independently of each other on their respective centers of motion at their upper end parts, by which means they permit either draft animal, which animals are hitched directly or indirectly, one to the lower end of each side part of the axle, to advance relatively to its fellow draft animal and thereby advance the wheel and the plow gang at its side of the cultivator relatively to the wheel and plow gang at the other side of the cultivator. In this class or type of cultivator, each draft animal to a great extent, draws the plow gang which is hinged to and follows its side of the cultivator, and as the draft animals are almost constantly advancing alternately with reference to each other, the lower ends of the vertical sides of the axle are correspondingly being advanced with reference to each other, and thereby the angular relations of the sides of the axle are being constantly changed; and the principal object of this invention is to provide for this class or type of cultivator an improved spring counterbalancing mechanism for the plow gangs, which is of such nature that the force action of the spring on the plow gang when said gang is in its working position in the ground, is substantially the same whatever inclined or angular position the verticle side of the axle to which it is hinged may be swung into by the draft animals, with reference to the other side of the axle, thus securing a substantially uniform force action of the springs on their respective plow gangs during all of the varying angular relations or inclinations of the vertical sides of the axle to each other, while the gang beams are in or substantially in a horizontal position, as when at work in a field, and in which the same substantially uniform force action of the springs on the plow gangs is also secured while the plow gangs are in any particular angular position with reference to their horizontal positions, during all of the varying angular relations or inclinations of the vertical sides of the axle to each other, or in other words, assuming the plow gangs or either of them to be in a horizontal position, as in cultivating, or elevated or lowered to any particular angular position with reference to a horizontal position, while in any one of said positions should either side of the axle be advanced with reference to its other side, during all such advancement the force action of the spring on the gang will be substantially uniform and unchanged while the plow gang remains in a horizontal position, or in any one of its angular relations thereto, arising from raising and lowering the gangs at their rear parts in the various operations thereof.

To the end of carrying out this principal object of my invention, my improvement consists in its main feature in a spring counterbalancing mechanism in which a draft rod journaled at one end on the horizontal lower end part of each side part of the axle, projects forwardly from the axle, and is connected at its forward end to one end of an evener bar which is pivotally mounted on the tongue or frame of the cultivator, in such manner that the horizontal end part of the axle and the lower end part of the evener will move in unison both forwardly and rearwardly, and which draft rod on the forward end part thereof is encircled by a spirally coiled thrust spring that contacts at its forward end with the draft rod, and at its rear end pivotally connected with the forward end of a link or links, the rear ends of which link or links are pivotally connected with the forward ends of an arm or arms, as the case may be, which are fixed to and project radially from a sleeve that is mounted loosely to have a back and forth revoluble movement on the horizontal end part of the axle, and which sleeve has also radially projecting arms to which the plow beam is hinged or journaled for lateral flexure thereon, its vertical flexure being with said arms and sleeve and on the horizontal end of the axle as a center of motion.

A further object of my invention is to provide hang up bars for the plow gangs, the rear ends of which during all oscillations back and forth of the vertical sides of the axle, will be in substantially the same vertical planes over their respective points of attachment to the plow beams when suspended thereon, and to this end and object my improvement consists in hang up bars connected directly or indirectly at their forward ends, each to the end of the evener bar at its side of the cultivator, and each passed loosely through an eye or loop fixed to the vertical part of the axle on the same side of the cultivator to permit of the hang up bar sliding endlong of itself with reference to the vertical part of the axle, when said parts of the axle are oscillated with respect to each other.

A further object of my invention is to combine with a sleeve mounted on the horizontal end of the axle and having projecting arms for the attachment of a plow gang, and a radial arm or arms for the attachment of a lifting spring, and a draft rod connected at its rear end with the axle and at its forward end with an evener bar, a cushioned spring carried by the radial arms with which the lifting spring is connected, and which is inoperative until the plow gang is lowered into working position, when it operates to gage the depth of cultivation, and then operates to exert an increasing resistance as the plow gang is lowered, but which yields to permit of forcing the plow gang downwardly by hand when the cultivator shovels pass over low places, or whenever it may be desired to do so.

The different combinations which have been evolved in carrying out these objects of my invention, the separate and collective operations of the parts comprised in the invention, the respective new modes of operation, and new and useful results arising therefrom, are hereinafter described, and the new combinations are made the subject matter of claims hereto appended.

In the accompanying drawings all my improvements are shown as constructed and embodied in a preferred way. Obviously however, while still within the purview of my invention, some or all of the parts may differ in their construction, in their organization, their disposition for co-action, and be embodied in other forms and ways from what I have shown in said drawings, in which—

Figure 2:
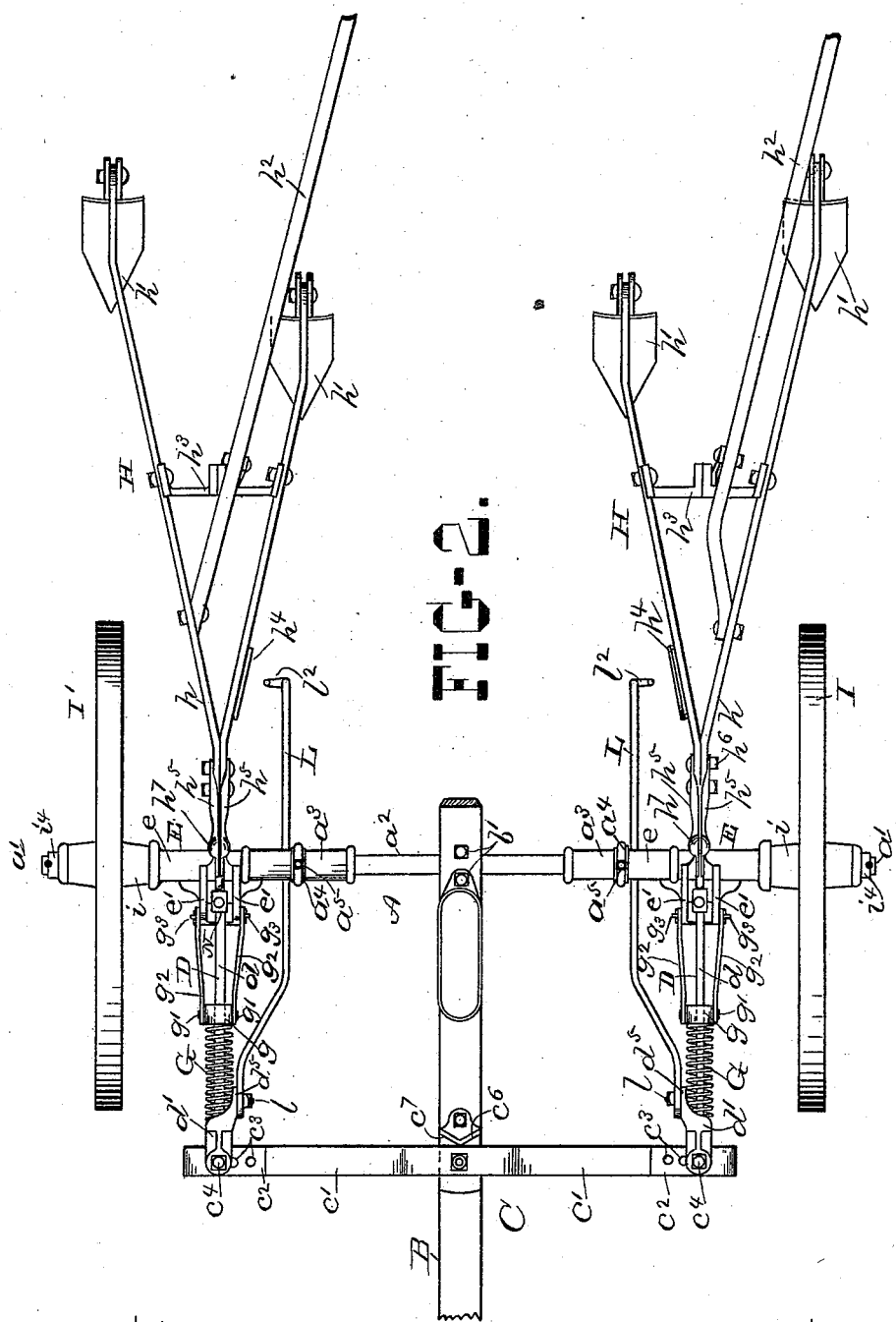
Figure 3:
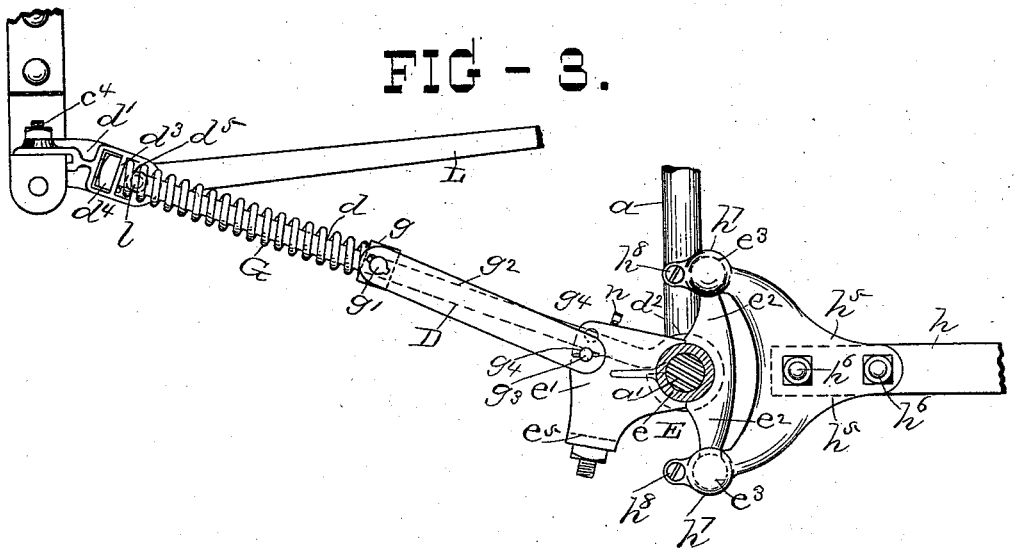
Figure 4:
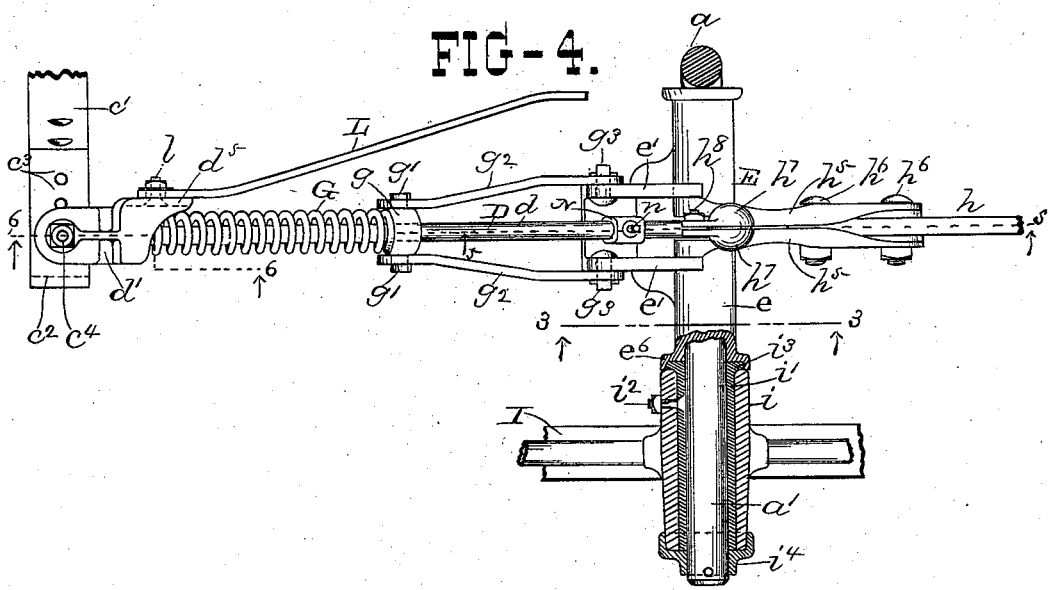
Figure 8:
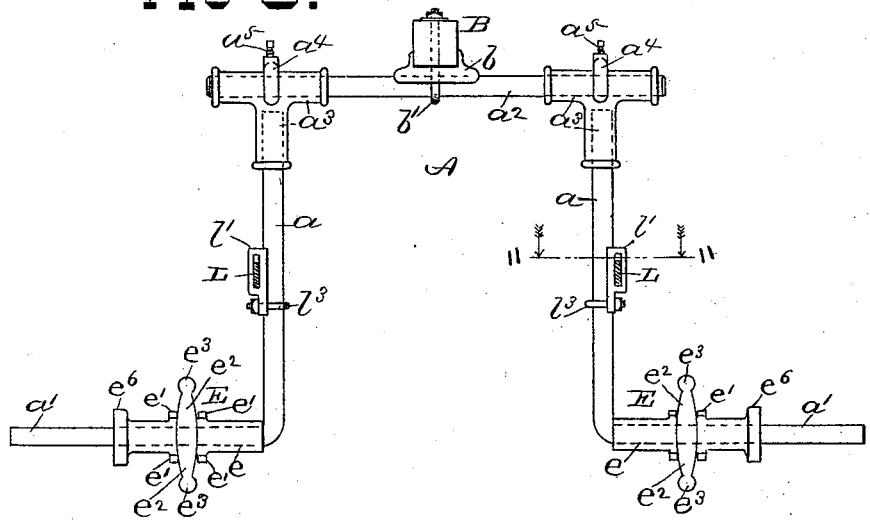
Figure 9:
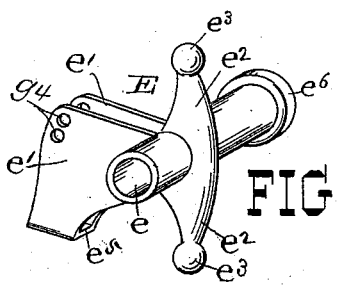
Figure 10:
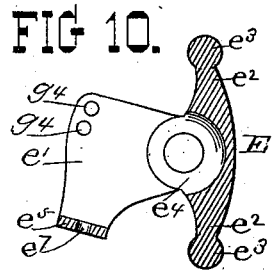
Figure 11:
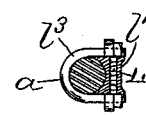
Figure 12:
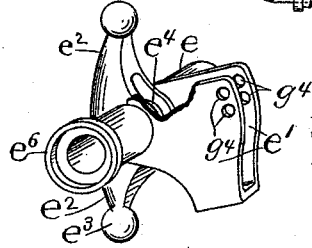

Figure 1 is a side elevation of a cultivator embodying my invention, with one side part of the axle and its connected plow gang advanced, and the other part of the axle and its connected plow gang retarded; the tongue and handles shown as partly broken away; Fig. 1$^a$, a reduced side elevation, with both side parts of the axle in their vertical positions, and the plow gangs in their elevated or suspended positions; the tongue, plow gangs and wheel spokes shown as partly broken away; Fig. 2, a top plan, the tongue and plow handles broken away; Fig. 3, a sectional elevation in the line 3—3 in Fig. 4, of the sleeve and axle, and side elevation of the spring counterbalancing mechanism, radial arms on the sleeve and beam coupling to the axle; Fig. 4, a top plan of the spring counterbalancing mechanism, end of evener bar, part of hang up bar, beam coupling, main part of sleeve, and one end of axle, and sectional plan of wheel hub, wheel, and part of sleeve; Fig. 5, an enlarged sectional elevation in the line 5—5 in Fig. 4, the lifting spring and draft rod partly broken away at their forward ends; Fig. 6, an enlarged sectional elevation in the line 6—6 in Fig. 4, parts in elevation; Fig. 7, a side elevation of the axle in same position as at Fig. 1, showing all of the forward part of the near beam plate removed and the coupling sleeve, beam plate, near horizontal lower part of the axle and other adjacent parts of the near plow gang in sectional elevation, and side elevation of the farther plow gang in a horizontal working position, and of the near plow gang in a slightly elevated position; Fig. 8, a rear elevation of the axle, tongue, and sleeve couplings; Fig. 9, a perspective of the coupling sleeve, showing its front, rear and near sides; Fig. 10, a central sectional elevation of the coupling sleeve; Fig. 11, a sectional plan in the line 11—11 in Fig. 8; Fig. 12, a perspective of the coupling sleeve, partly broken away showing its front, upper and near sides.

The arched axle A is of an ordinary construction, (see Fig. 8,) having vertical side parts $a$ with lower horizontal or journal end parts $a'$, and upper horizontal parts $a^2$. T-shaped sleeves $a^3$ have the upper ends of the parts $a$ fixed in their vertical parts, and the ends of the part $a^2$ adjustably seated in the horizontal parts thereof, whereby the sleeves may be adjusted endlong of the part $a^2$ for the purpose of adjusting the distance of the plow gangs apart, and are held after such adjustments by an ordinary keeper $a^4$ which is seated in a slot in the sleeve $a^3$, encircles the part $a^2$, and is fixed to the part $a^2$ by means of a set screw $a^5$. The keeper $a^4$, when fixed, holds the sleeve $a^3$ against movement endlong of the part $a^2$, but permits the sleeve to oscillate thereon, and thus permits the vertical side parts $a$ to oscillate independently of each other on the parts $a^2$ as a center of motion, as shown at Fig. 1, and to an extent limited as hereinafter described.

The tongue B is fixed to the part $a^2$ of the axle by a plate $b$ and clip $b'$ in an ordinary manner, and carries forward of the axle an ordinary evener bar C, pivoted at its midlength to the tongue. From the tongue the ends $c'$ of the evener bar preferably extend downwardly and incline outwardly to a short distance from their ends, where each end has a horizontal part $c^2$ with a series of holes $c^3$ for the attachment of a coupling plate hereinafter described, by means of a bolt $c^4$, and has a down turned end $c^5$ for the attachment of a draft animal. The coincident lower ends, or ends on the same side of the tongue, of the evener bar, and the lower part $a'$ of the axle are connected by a draft rod D, which may be a simple rod pivotally connected with each of said parts, but which, for purposes hereinafter described, I prefer formed of a rod $d$ and a coupling plate $d'$. The rear end of the rod $d$ is formed into an eye $d^2$, which encircles the part $a'$ of the axle, and its forward end passes through a ledge $d^3$ on the coupling plate $d'$, and is adjustably secured thereto by a nut $d^4$ on the end of the rod $d$. The forward forked end of the plate $d'$ is pivotally connected with the part $c^2$ of the evener bar by the bolt $c^4$. With the evener bar and lower parts of the axle thus connected, each draft animal will to a great extent draw the plow gang hinged to the same side of the axle, and the movement of either draft animal and the end of the evener with which it is connected forwardly with respect to the other draft animal and the end of the evener with which it is connected, will correspondingly advance the coincident lower end part of the axle and the plow gang connected therewith relatively to the similar parts at the other side of the cultivator, or in other words the connections described, between the ends of the evener and the coincident lower ends of the axle will cause the lower end of each side of the axle to move substantially in unison with the lower end of the evener bar with which it is connected, and the extent to which the evener bar and the vertical side parts of the axle can be thus oscillated is limited by the stops $c^6$, $c^7$, which are fixed to the tongue, and with which the evener bar contacts in an evident manner. See Figs. 1 and 2.

When the vertical side parts of the axle are adjusted by adjusting the sleeves $a^3$ on the parts $a^2$ of the axle, for the purpose of adjusting the distance apart of the plow gangs, the forward ends of the draft rod or coupling plate $d'$ can be correspondingly adjusted by adjusting the plate $d'$ on the part $c^2$ of the evener bar and securing it after such adjustment by means of the bolt $c^4$ and holes $c^3$ in an evident manner.

The coupling sleeves E each consists of a sleeve part $e$ which is loosely mounted on the horizontal lower end part $a'$ of the axle, arms or plates $e'$ which project radially and forwardly from the sleeve part $e$, and arms $e^2$ which project tangentially in opposite directions from the sleeve part $e$, and from the opposite side of said sleeve from the radius arms or plates $e'$. The outer end of each arm $e^2$, as shown is preferably a spherical-shaped head $e^3$, for purposes in connection with my beam coupling hereinafter described, but in so far as my lifting spring is concerned, the arms $e^2$ may be of any desired form that will make a suitable coupling with the plow beam.

Between the radius arms $e'$ there is a slot $e^4$ in the parts $e$ and $e^2$ of the sleeve E (see Figs. 5, 10 and 12) through which the eye $d^2$ of the draft rod passes, and in which it is loosely seated where it loosely encircles the part $a'$ of the axle, as shown best at Fig. 5. The outer ends of the radius arms $e'$, as shown, are extended somewhat downwardly and are connected at their lowermost parts by a shelf $e^5$ for purposes in connection with the cushion spring hereinafter described, but in so far as the lifting spring counterbalancing mechanism is concerned it is fully operative without the shelf $e^5$ or the cushion spring carried thereby.

The lifting spring G, as shown, is a spirally coiled spring, encircling or coiled loosely on the part $d$ of the draft rod D. The spring G is compressed between the ledge $d^3$ and a ring or collar $g$ through which the rod $d$ loosely passes, so that it will exert a force action as a thrust spring. The collar $g$ has trunnions $g'$ at its diametrically opposite sides, on which are pivotally mounted the forward ends of links $g^2$, the rear ends of which links are pivotally connected, one with the forward end and upper part of each radius arm $e'$, by means of a bolt $g^3$ which passes through a hole in the link $g^2$, and either of the holes $g^4$ in the radius arm $e'$. The links $g^2$ hold the collar $g$ to compress the spring G, while allowing the collar to slide on the rod with the links when they are flexed on the pivot trunnions $g'$ as hereinafter described.

The plow gangs H are of ordinary construction, except the beam plates, and consist of an ordinary beam $h$, plows or shovels $h'$, handles $h^2$, braces $h^3$ and hang up staple $h^4$. The plow beam coupling plates are each in two parts $h^5$, which are fitted at their rear ends to the forward end of the plow beam $h$, to which they are secured by through bolts $h^6$. The forward parts of the beam plates are crescent shaped, and have semi-spherical depressions or sockets $h^7$ near their outer ends and in their confronting faces. The ends of the parts $h^5$ extend beyond the depressions or sockets $h^7$ and are secured to each other by a through bolt $h^8$. The sockets $h^7$ of each pair of beam plates seat upon the heads $e^3$ of the arms $e^2$ of the coupling sleeve, and as shown best at Fig. 4, the plates $h^5$ are a slight distance apart, so that by tightening the bolt $h^8$ the socket seats $h^7$ can at any time required be brought closer to the head $e^3$ to compensate for wear or to tighten the joint at $e^3$, $h^7$, which is the center of motion on which the plow gangs are flexed, or swung laterally. The parts $a'$ of the axle are the centers of motion on which the plow gangs are respectively flexed, or swung vertically, by reason of their connection with the sleeves E in such manner that each sleeve E oscillates in unison with the plow gang coupled thereto, as described. The parts $h'$ are of such forms that they are inter-changeable, and can be inverted and used on either side of a plow beam, and also the same beam plates can be used on either plow beam.

The sleeves E are each held in proper positions lengthwise of and on the part $a'$ of the axle, by the vertical side part of the axle at its inner end, and by the adjacent wheel hub $i$ of the wheel I or I' which is at its other end, and which wheels are journaled on the part $a'$ of the axle. See Fig. 4. Each wheel hub $i$ is provided with a chilled boxing $i'$ which is held in place in the hub by a bolt $i^2$ and has an annular flange $i^3$ on its inner end which abuts against the hub on one side thereof, and at its other side enters a socket flange $e^6$ on the outer end of the part $e$, which flange extends over the end of the boxing $i'$ as a sand guard for the journal or part of the axle $a'$, as shown at same figure. The washers $i^4$ secure the wheels I, I', in place on the journals $a'$.

Each hang up bar L is pivotally connected by a bolt or rivet $l$ at its forward end, to a rearward extension $d^5$ of the plate $d'$, and is thus indirectly connected with the evener bar to extend rearwardly therefrom through a slotted block $l'$ which is adjustably connected with the adjacent side part $a$ of the axle, and thence extends rearward of the axle and has a hook $l^2$ on its rear end with which hook the staple $h^4$ on the adjacent plow beam is engaged to suspend the plow, for purposes hereinafter described. By adjusting the slotted blocks $l'$ at different elevations on the vertical part $a$ of the axle, (see dot lines at Fig. 1,) and fixing them after such adjustments by means of the clips $l^3$, the plow gangs can be held at different heights.

By reference to Fig. 1 it will be seen that when either vertical side part of the axle is inclined rearwardly at its lower end, the hang up bar at that side of the cultivator will be projected in rear of said vertical side part to a greater extent than the other hang up bar is projected in rear of its vertical side part of the axle, and hence that as the axle is flexed or its vertical side parts advanced or receded, the hang up bars will be automatically adjusted to project the proper distances in rear of the side parts of the axle for engagement with the staple on the plow beam.

Assuming that the rear ends of the links $g^2$ as shown in the drawings are pivotally connected by the bolt $g^3$ with the lower one of the holes $g^4$ in the radius arms $e'$, the operation of the lifting spring or counterbalancing spring mechanism is as follows: Whenever either plow gang is swung upwardly from a horizontal position, or working position as in operation in cultivating rows of plants, the radius arms $e'$ will be turned downwardly at their forward ends, as shown at Fig. 7, and will carry the rear ends of the links $g^2$ downwardly and thus bring them and the radius arms $e'$ into such angular relation that the force action of the spring will tend to force the forward ends of the radius arms $e'$ downwardly, and thereby exert a lifting force action on the plow gang, tending to swing it upwardly on its center of motion $a'$. As the plow gang is more elevated at its rear end, or swung upwardly, the angle at which the links $g^2$ will act on the radius arms $e'$ will more nearly approach a right angle, and it will be evident that as the angle at which said links act on said radius arms approaches a right angle, the force action of the springs operating at a greater advantage, will act with a regularly increased effect as the plow gang is more elevated, or more swung upwardly, until it reaches the position shown at Fig. 1ª, where the gang is suspended on a hook $l^2$ of the hang up bar, by engaging the staple $h^4$ with said hook, for turning the cultivator at the ends of bouts or rows, for local transportation on its own wheels, or for other purposes, and when the plow beams are in a horizontal or approximately horizontal position, as at work, the pivotal points of the two ends of the links $g^2$ and the center of the journal $a'$ are so nearly in line that the spring merely exerts sufficient force to counterbalance the weight of the plow gang when in ordinary operation, or cultivating soil of ordinary hardness. By adjusting said links and connecting their rear ends with the upper hole $g^4$ in the forward end of the arms $e'$, then when the plow gangs are in a horizontal working position, the pivotal connection of the rear ends of the links $g^2$ with the arms $e'$ is slightly above the center of the axle, and the spring will then exert a slight downward pressure on the plow gang for use in moderately hard ground, which pressure may be increased for use of the cultivator in still harder ground by adjusting the nut $d^4$ toward the spring on the rod $d$, and thereby increasing the tension of the spring and consequently increasing its thrusting force action. Adjustment of the nut in the opposite direction to that described, will, of course, diminish the tension of the spring, and the nut can be thus adjusted so that the spring G will when the links are adjusted in the upper hole $g^4$ exert but little force downwardly on the plow gang when the plow gang is in its lowered or substantially horizontal working position, as in the cultivation of plants.

The most essential and distinctive feature in the operation of the spring counterbalancing mechanism is its adaptability to flexible axles such as have the oscillating side parts substantially such as shown and described herein. The disposition or arrangement of the parts and their organization is such that when the plow gangs are, for instance, in their working positions, as shown at Fig. 1, with the left hand side of the axle and left hand plow gang advanced relatively to the right hand side of the axle and right hand plow gang, and the springs G are adjusted to exactly counterbalance the weight of the plow gangs, their effect in so counterbalancing the weight of the plow gangs will not be changed during any advancements or retardments of either side of the axle and either plow gang, relatively to the other side of the axle and the other plow gang, while the plow gangs remain in substantially the same horizontal working positions described; and further, when either plow gang is elevated, for instance, as shown at Fig. 7, and the spring G connected therewith exerts a certain lifting force action, the effect of said spring, or that certain force action will not be changed during any advancements or retardments of either side of the axle and either plow gang, relatively to the other side of the axle and the other plow gang, while the plow gang remains at the same angle of elevation, and the same may be said of the operation of the device at whatever angle of elevation the plow gangs may be in. By reason of this feature of my invention it provides for the difficulty which has heretofore existed in the use of spring counterbalancing mechanisms in cultivators having flexible axles of the class herein described, in which with springs adjusted so that when the vertical side parts of the axle were in certain relative positions to each other, for instance, when both vertical, as shown at Figs. 1ª and 2, the springs would counterbalance the weight of the plow gangs when in operation in the ground cultivating plants, but when either side part of the axle and the plow gang coupled thereto was advanced relatively to the other side, by its connected draft animal, and the other side retarded, as shown at Fig. 1, the springs would no longer counterbalance the weight of the plow gangs, but instead thereof, by the changed relation of the parts the lifting effect on one spring would be considerably or entirely removed, and on the other it would be increased, and the effect of the springs would thus be continually varying as either side part of the axle would be advanced, as is continually occurring, by the irregular movements of the draft animals. It need not be here stated that this irregular action of the springs while the plow gangs are at work interferes greatly with effective work, and renders the manipulation of the gangs much more difficult.

It will be seen by examination of Fig. 3, that in my improved cultivator, when the plow gangs are in position for work, that when one side part of the axle is advanced and the other retarded, that the draft rod, spring, coupling sleeve E, with its arms $e'$, $e^2$, and the plow gangs, at both sides of the cultivator bear the same relation to each other, and hence operate with the same effect on the plow gangs, and by reason thereof the gangs are more easily operated, and more effective work can be accomplished.

The cushioned spring mechanisms M, shown best at Figs. 5 and 7, consist each of a bolt $m$, the lower end part of which passes through an aperture $e^7$ in the shelf $e^5$, and below said shelf has a nut $m'$ screwed thereonto so as to slightly compress a spirally coiled spring $m^2$ which encircles the bolt $m$, between the shelf $e^5$ and head $m^3$ of the bolt $m$. A stop block N is adjustably mounted on the rod $d$, and is held in place thereon in proper relation to the head $m^3$ of the bolt $m$ by a set screw $n$. The block N may be dispensed with if preferred, and the head $m^3$ will then contact with the rod $d$.

The bolt head $m^2$ of each pressure spring mechanism M is at such height above the shelf $e^5$, or relatively to the journal $a'$ and other adjacent parts, that when the plow gang is in any of its elevated positions, as shown at Fig. 7, and above its working position shown at Fig. 1, the stop block N will be above and not in contact with the head $m^3$ of the bolt $m$, and hence will not in any manner act upon the plow gang while in such positions. When the plow gang is lowered to its ordinary working position, shown at Fig. 1, then the block N contacts with the head $m^3$ or with the rod $d$ if the block N, is not used, and the spring $m^2$ acts with a yielding force action to resist the further downward descent of the rear end of the plow gang and its cultivator shovels or blades, and thus becomes a cushioned gage to regulate the depth of cultivation, the tension of the spring $m^2$ being so adjusted that while it will so act as a gage when it contacts with the head $m^3$ or other part of the spring counterbalancing mechanism it will yield so that in passing over dead furrows, and wherever it is desired to lower the gang or gangs and cultivator shovels or blades below the ordinary working position, the operator by pressing on a handle $h^2$ can force the plow gang down against the resistance of the spring $m^2$ for that purpose. This spring $m^2$ does not interfere with the operation of the counterbalancing spring mechanisms in counterbalancing and sustaining the weight of the plow gangs when the cultivator is in ordinary operation, and when so balanced and sustained the gangs are more easily manipulated, run easier or with less draft, because the sliding and scraping frictional support of the cultivator shovels or blades beneath the ground, is transferred to the rolling support of the wheels I, I′, on the surface of the ground.

By adjusting the nut $m'$ and lowering the head $m^3$ of the bolt $m$, the plow gang will have to be lowered more at its rear end before the block N contacts with the head $m^3$, and hence the gangs will thereby be adjusted for deeper cultivation; and in such case the tension of the spring G can be adjusted to counterbalance the weight of the plow gang when the bolt $m$ is brought into contact with the block N or other suitable part of the counterbalancing spring mechanism.

What I claim as new is—

1. In a wheel cultivator, in combination, a flexible axle of the class hereinbefore described, a sleeve journaled on the lower horizontal part of said axle and provided with radius arms projecting forwardly therefrom and other arm or arms at the opposite side thereof, plow gangs hinged to swing laterally on said last named arm or arms, and to swing vertically therewith and with said sleeve, a pivoted evener bar, a draft rod connecting the lower horizontal part of the axle and the evener bar, a thrust lifting spring encircling said draft rod, and links connecting said spring and the forward end of said radius arms, substantially as described and for the purpose specified.

2. In a wheel cultivator, in combination, a flexible axle of the class hereinbefore described, a sleeve journaled on the lower horizontal part of said axle and provided with radius arms projecting forwardly therefrom, and with other arm or arms at the opposite side of said sleeve, plow gangs hinged to swing laterally on said last named arm or arms, and to swing vertically therewith and with said sleeve, a pivoted evener bar, draft rods, each formed of a coupling plate connected with the evener bar, and a rod connected with the lower horizontal part of the axle, a thrust lifting spring encircling the forward part of each of said draft rods, between the coupling plate and a sliding collar on the draft rod, and links pivotally connected with said collar at one end, and at their other ends pivotally connected with the forward ends of the radius arms, substantially as described and for the purpose specified.

3. In a wheel cultivator, in combination, a flexible axle of the class hereinbefore described, a sleeve journaled on the lower horizontal part of said axle and provided with radius arms projecting forwardly therefrom and with other arm or arms at the opposite side of said sleeve, plow gangs hinged to swing laterally on said last named arm or arms and to swing vertically therewith and with said sleeve, an evener bar pivotally mounted on the tongue, draft rods each formed of a coupling plate connected at one end with the evener bar and of a rod adjustably connected at one end with said coupling plate and at its other end connected with the lower horizontal end part of the axle, a collar loosely mounted on said draft rod, a thrust lifting spring encircling the forward part of said draft rod between the coupling plate and said collar, and links pivotally connected with said collar at one end, and at their other ends pivotally connected with the forward ends of the radius arms, substantially as and for the purpose specified.

4. In a wheel cultivator, in combination, a flexible axle of the class hereinbefore described, a sleeve journaled on the lower horizontal end part of said axle and provided with radius arms projecting forwardly therefrom, and other arm or arms at the opposite side thereof, plow gangs hinged to swing laterally on said last named arm or arms and to swing vertically therewith and with said sleeve, an evener bar pivotally mounted on the tongue, draft rods each connecting the lower horizontal part of the axle and the evener bar, a thrust lifting spring encircling each of said draft rods, and links pivotally connected at one end with said spring, and adjustably connected at their other ends with the forward ends of said radius arms, substantially as and for the purpose specified.

5. In a wheel cultivator, in combination, a flexible axle of the class hereinbefore described, a sleeve journaled on the lower end part of said axle and provided with radius arms projecting forwardly therefrom, extending downwardly and provided with a shelf at their lower parts, and other arms at the opposite side of the sleeve, plow gangs hinged to swing laterally on said last named arms and to swing vertically therewith and with said sleeve, an evener bar pivotally mounted on the tongue, draft rods, each connecting the lower horizontal part of the axle and the evener bar, a stop on said draft rods, a spring spirally coiled on a vertical bolt which is supported on said shelf, and compressed between the head of said bolt and said shelf, whereby the spring and bolt will be out of contact with said stop until the plow is lowered to work, and then will contact with the stop and control the depth of cultivation, substantially as described.

6. In a wheel cultivator, in combination, a flexible axle of the class hereinbefore described, a sleeve journaled on the lower end part of said axle and provided with radius arms projecting forwardly therefrom, extending downwardly and provided with a shelf at their lower parts, and other arms at the opposite side of the sleeve, plow gangs hinged to swing laterally on said last named arms and to swing vertically therewith and with said sleeve, an evener bar pivotally mounted on the tongue, draft rods each connecting the lower horizontal part of the axle and the evener bar, a lifting spring encircling the forward part of said draft rod, links connecting said lifting spring with the forward ends of said radius arms, and a vertical spring $m^2$, bolt $m$ with head $m^3$ and nut $m'$, arranged to contact with a stop on the draft rod, substantially as described.

7. In a wheel cultivator, in combination, a flexible axle of the class hereinbefore described, a sleeve journaled on the axle and provided with radius arms projecting forwardly therefrom and other arms at the opposite side of the sleeve, plow gangs hinged to swing laterally on said last named arms and to swing vertically therewith and with said sleeve, a spring counterbalancing mechanism adapted to act on the radius arms to raise the plow gangs above the surface of the ground, and a spring mounted on the radius arms and adapted to contact with a part of the counterbalancing mechanism when a plow gang is lowered to work, and to be out of contact therewith when the plow gang is raised above its working position.

8. In a wheel cultivator, in combination, an arched axle, journals, a sleeve journaled on each of said journals and provided with radius arms projecting forwardly therefrom and other arms at its opposite side, a plow gang hinged to swing laterally on said last named arms and to swing vertically therewith and with said sleeve, a spring mechanism acting on said radius arms to counterbalance the weight of the plow gangs when in ordinary working position, and a yielding cushion spring carried by said radius arms and arranged to contact with said counterbalancing mechanism, whereby it gages the depth of cultivation, substantially as described.

9. In a wheel cultivator, in combination, a journal, a coupling sleeve mounted on said journal and having oppositely projecting arms $e^2$, with spherical heads $e^3$ on their outer ends, and interchangeable beam coupling plates in two parts $h^5$ fixed at their rear ends to the plow beam, and having crescent shaped forward ends each with a semi-spherical socket $h^7$, which sockets seat upon the heads $e^3$, and having extensions through which a bolt $h^8$ passes for adjusting the beam plates to compensate for wear, substantially as described.

In testimony whereof I affix my signature in presence of two witnesses.

WILLIAM T. M. BRUNNEMER.

Witnesses:
V. H. WEBB,
W. A. DETRICK.